(No Model.)
G. W. SOUTHWICK.
CHAFE IRON FOR VEHICLES.
No. 417,751. Patented Dec. 24, 1889.
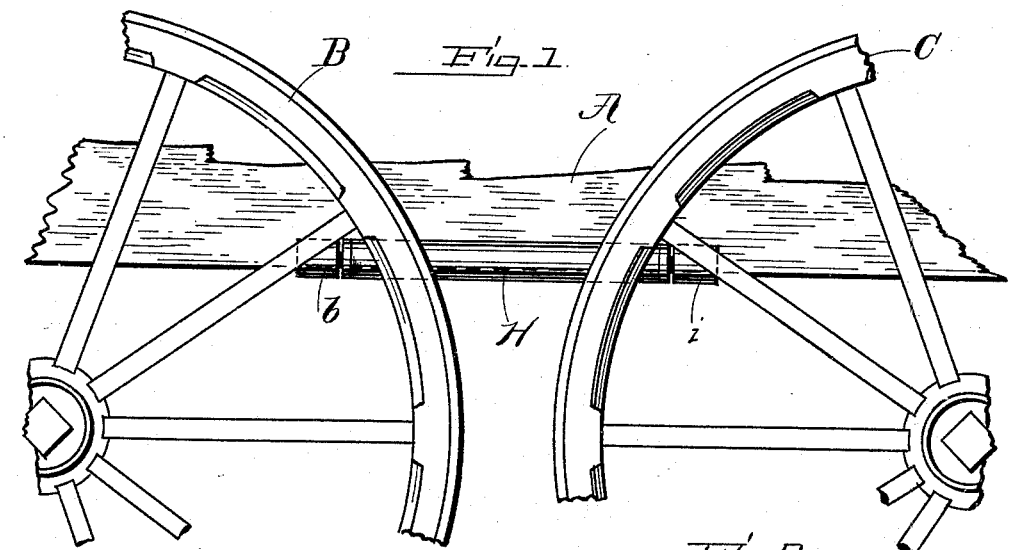
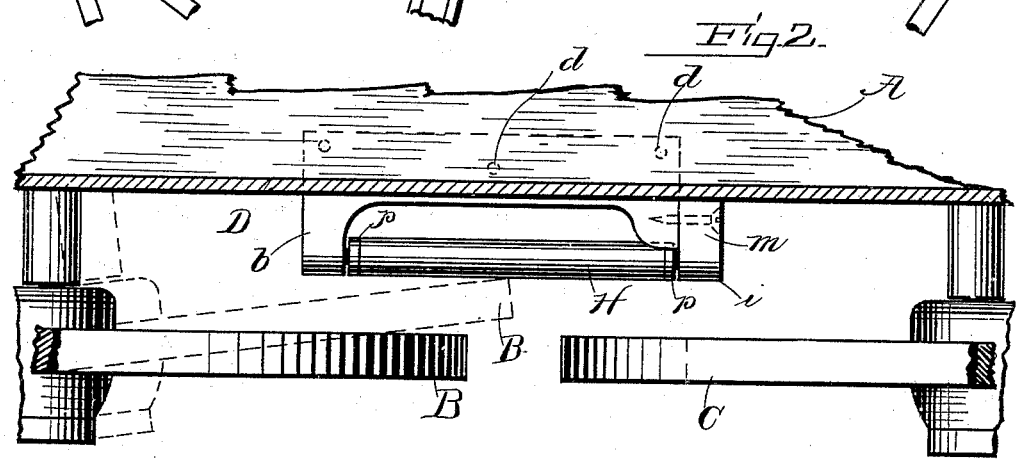
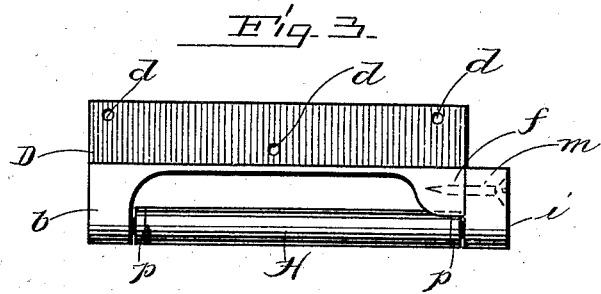
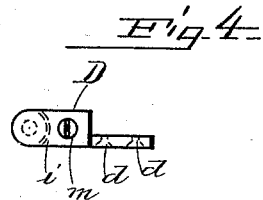
WITNESSES:
INVENTOR:
George W. Southwick,
PER Shaw & Lee,
ATT'YS

UNITED STATES PATENT OFFICE.

GEORGE W. SOUTHWICK, OF FRANKLIN, MASSACHUSETTS.

CHAFE-IRON FOR VEHICLES.

SPECIFICATION forming part of Letters Patent No. 417,751, dated December 24, 1889.

Application filed October 14, 1889. Serial No. 326,987. (No model.)

*To all whom it may concern:*

Be it known that I, GEORGE W. SOUTHWICK, of Franklin, in the county of Norfolk, State of Massachusetts, have invented certain new and useful Improvements in Chafe-Irons for Vehicles, of which the following is a description sufficiently full, clear, and exact to enable any person skilled in the art or science to which said invention appertains to make and use the same, reference being had to the accompanying drawings, forming part of this specification, in which—

Figure 1 is a sectional elevation of a vehicle provided with my improved chafe-iron; Fig. 2, a top plan view of the same; Fig. 3, a top plan view of the chafe-iron bracket removed, and Fig. 4 an end elevation of the same.

Like letters of reference indicate corresponding parts in the different figures of the drawings.

My invention relates especially to that class of chafe-irons which are provided with a roll; and it consists in certain novel features hereinafter fully set forth and claimed, the object being to produce a simpler, cheaper, and more effective device of this character than is now in ordinary use.

The nature and operation of the improvement will be readily understood by all conversant with such matters from the following explanation:

In the drawings, A represents the body of the vehicle, and B C the wheels, these parts being all of the ordinary form and construction. A bracket D is provided with a laterally-projecting arm $b$, and at the opposite end with a boss or stud $f$. Screw-holes $d$ are formed in the body of the bracket for securing it to the vehicle-body. The arm $b$ is provided with an opening in which one end of the roll H is journaled. The opposite end of said roll is journaled in a corresponding opening in the block $i$, which is secured to the boss $f$ by means of a screw $m$. The bracket D is secured to the vehicle, as described, in such manner that the roll H is parallel with or is arranged longitudinally on said body, as shown in Figs. 1 and 2. A washer $p$ is disposed at each end of the roll to prevent longitudinal movement thereof. The wheel B, coming in contact with the roll H, as shown by dotted lines in Fig. 2, causes said roll to revolve and permits said wheel to slip easily thereon without binding, as frequently happens with chafe-irons of ordinary construction.

Chafe-irons provided with a roll are usually constructed with said roll arranged at such an angle to the vehicle-body that it registers with the wheel-tire when engaged thereby. As said roll is disposed above the hub of the wheel, it frequently binds on the tire and causes the vehicle-body to be elevated.

In my improvement only the edge of the tire engages the chafe-roll, rendering it impossible to bind.

Having thus explained my invention, what I claim is—

In a chafe-iron for vehicles, the bracket D, adapted to be secured to the vehicle-body and provided with an arm $b$ and stud $f$, in combination with the roll H, journaled in said arm, and the block $i$, secured to said stud, substantially as and for the purpose set forth.

GEORGE W. SOUTHWICK.

Witnesses:
MILTON M. FISHER,
MARY E. FISHER.